(12) United States Patent
Kim et al.

(10) Patent No.: US 9,948,510 B2
(45) Date of Patent: Apr. 17, 2018

(54) METHOD AND APPARATUS FOR MANAGING ACCESS INFORMATION FOR REGISTRATION OF DEVICE IN SMART HOME SERVICE

(71) Applicant: Samsung Electronics Co., Ltd., Gyeonggi-do (KR)

(72) Inventors: Jun-Hyung Kim, Gyeonggi-do (KR); Dong-Keon Kong, Gyeonggi-do (KR); Se-Hoon Kim, Seoul (KR); Jai-Ick Chun, Seoul (KR)

(73) Assignee: Samsung Electronics Co., Ltd (KR)

( * ) Notice: Subject to any disclaimer, the term of this patent is extended or adjusted under 35 U.S.C. 154(b) by 282 days.

(21) Appl. No.: 14/626,535

(22) Filed: Feb. 19, 2015

(65) Prior Publication Data
US 2015/0236908 A1    Aug. 20, 2015

(30) Foreign Application Priority Data

Feb. 19, 2014    (KR) ........................ 10-2014-0019190

(51) Int. Cl.
*H04L 29/00*    (2006.01)
*H04L 12/24*    (2006.01)
*H04L 29/08*    (2006.01)

(52) U.S. Cl.
CPC .......... *H04L 41/0816* (2013.01); *H04L 67/32* (2013.01)

(58) Field of Classification Search
CPC ......... H04L 63/08; H04L 63/10; H04L 63/20; H04L 67/025; G06F 17/30082; G06F 21/60
See application file for complete search history.

(56) References Cited

U.S. PATENT DOCUMENTS

| | | | |
|---|---|---|---|
| 2011/0195714 A1* | 8/2011 | Sawinathan | H04W 60/005 455/435.1 |
| 2013/0159490 A1* | 6/2013 | Huh | H04L 41/50 709/223 |

FOREIGN PATENT DOCUMENTS

| | | |
|---|---|---|
| KR | 1020080107737 | 12/2008 |
| WO | WO 2013/175901 | 11/2013 |

OTHER PUBLICATIONS

European Search Report dated Jul. 21, 2015 issued in counterpart application No. 15155192.6-1853, 7 pages.

* cited by examiner

*Primary Examiner* — Ghazal Shehni
(74) *Attorney, Agent, or Firm* — The Farrell Law Firm, P.C.

(57) ABSTRACT

Methods and apparatuses are provided for managing access information for registration of a device in a smart home service. A validity period of a refresh token for updating an access token of a first device, from a device list for the smart home service, registered in a connectivity server, is checked, when the device list is received from a server. The server is requested to re-register the first device, when a period to the validity period is less than a predetermined threshold period.

14 Claims, 9 Drawing Sheets

METHOD AND APPARATUS FOR MANAGING ACCESS INFORMATION FOR REGISTRATION OF DEVICE IN SMART HOME SERVICE

PRIORITY

This application claims priority under 35 U.S.C. §119(a) to a Korean Patent Application filed in the Korean Intellectual Property Office on Feb. 19, 2014 and assigned Serial No. 10-2014-0019190, the content of which is incorporated herein by reference.

BACKGROUND OF THE INVENTION

1. Field of the Invention

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services, and to a method and an apparatus for managing access information for registration of a device in a smart home service.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Electrical and electronic appliances that are used in home are able to be connected to a wired/wireless system to enable bidirectional communication. A smart home service of a smart phone is able to control these appliances.

FIG. 1A shows a configuration of a home network that offers a general smart home service.

Referring to FIG. 1A, the home network includes a controller device 100, a controlled device 105, a connectivity server 110, an account server 115, and a service server 120.

The controller device 100 enables a user to check a status of a home appliance used in the smart home service or to control the home appliance. The controller device 100 may be embodied as a mobile device or a television (TV). The controlled device 105 is controlled by the controller device 100, and may be embodied as a home appliance, such as a washing machine, an air conditioner, etc. The account server 115 manages the user's account with respect to the controller device 100. When the user logs in, the account server 115 enables the controller device 100 to connect to the connectivity server 110 and the service server 120 based on the user's log-in information. The connectivity server 110 establishes a communication channel for message transfer between the controller device 100 and the controlled device 105. The connectivity server 110 also provides presence information informing whether the corresponding appliance can connect to the connectivity server 110, and a Network Address Translation (NAT) Traversal function for allowing remote interconnection by passing through a fire wall. The connectivity server 110 and the account server 115 are common servers that can be used in other services as well as the smart home service. The service server 120 is dedicated to the smart home service, and stores and manages information about smart home devices for circulation of information about smart home devices. Also, the service server 120 may manage all information for controlling smart home devices. The user can access the service server 120 using a smart home mobile application that is executed on the controller device 100 to newly register or read device information, or to register, read, or delete control information for centrally controlling controlled devices for the smart home service.

SUMMARY OF THE INVENTION

The present disclosure has been made to address at least the above problems and/or disadvantages and to provide at least the advantages described below. Accordingly, an aspect of the present disclosure provides a method and an apparatus for managing access information for registration of a device in a smart home service.

In accordance with an aspect of the present disclosure, a method is provided for managing access information for registration of a device in a smart home service. A validity period of a refresh token for updating an access token of a first device, from a device list for the smart home service, registered in a connectivity server, is checked, when the device list is received from a server. The server is requested to re-register the first device, when a period to the validity period is less than a predetermined threshold period.

In accordance with another aspect of the present disclosure, a method is provided for managing access information for registration of a device in a smart home service. A validity period of a refresh token of a first device is updated, based on an update time of the refresh token acquired from an update result of the refresh token, when the update result is received from an account server. A device list including the first device, in which the updated validity period of the refresh token is mapped, is transmitted to a terminal, when the terminal requests the device list for the smart home service.

In accordance with another aspect of the present disclosure, a controller device for managing access information for registration of a device in a smart home service is provided. The controller device includes a transceiver and a controller. The controller is configured to check a validity period of a refresh token for updating an access token of a first device, from a device list for the smart home service, registered in a connectivity server, when the device list is received from a server, and to control the transceiver to request the server to re-register the first device, when a period to the validity period is less than a predetermined threshold period.

In accordance with another aspect of the present disclosure, a service server for managing access information for registration of a device in a smart home service is provided. The service server includes a transceiver and a controller. The controller is configured to update a validity period of a refresh token of a first device, based on an update time of the refresh token acquired from an update result of the refresh token, when the update result is received from an account server, and to control the transceiver to transmit a device list including the first device, in which the updated validity period of the refresh token is mapped, to a terminal, when the terminal requests the device list for the smart home service.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION OF EMBODIMENTS OF THE PRESENT INVENTION

Figure 1A:
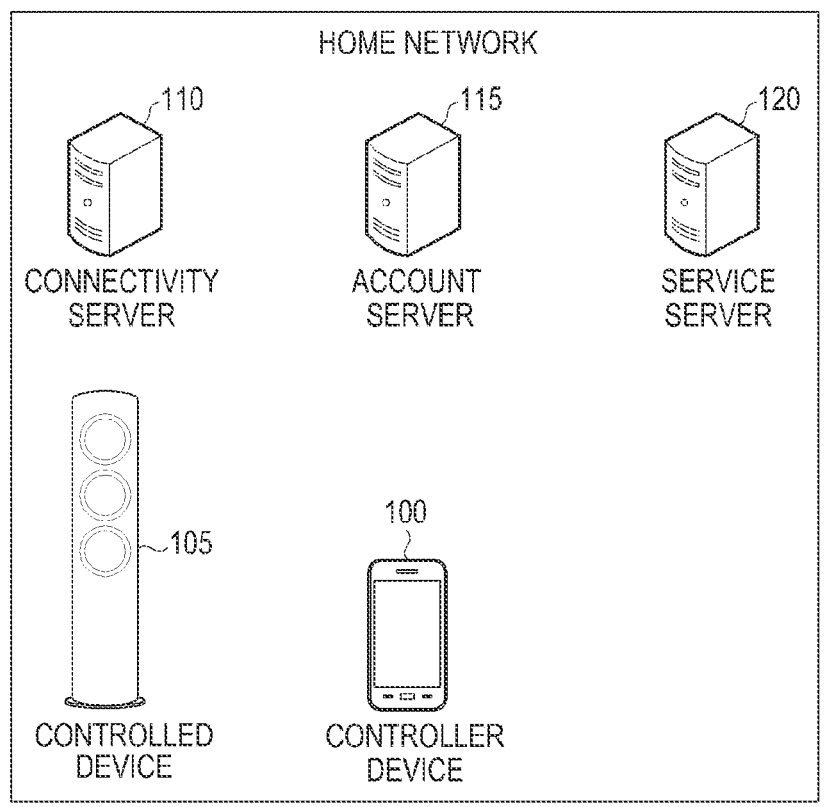
FIG. 1A is a diagram illustrating a configuration of a home network that offers a general smart home service.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Terms used herein are currently widely used general terms selected in consideration of the functions in the embodiments of the present disclosure. However, terms may be changed according to the intention of a user or operator, the practice, or the like. Thus, it will be appreciated that terms used herein must be construed based on the content herein.

Figure 1B:
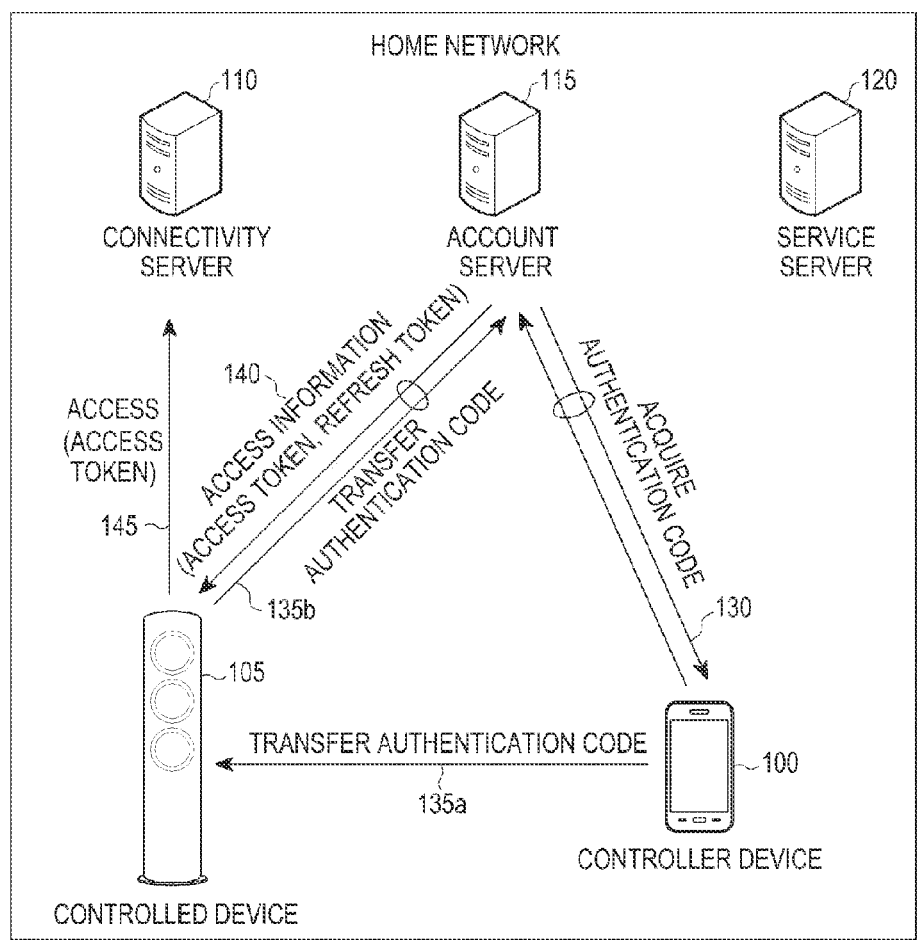
FIG. 1B is a diagram illustrating a method of registering a device for a general smart home service.

FIG. 1B is a diagram illustrating a method of registering a device for a general smart home service. The method of registering a device for a general smart home service is described based on a home network shown in FIG. 1A. It is assumed that a user executes a smart home application on the controller device 100. If an IDentifier (ID) and a password are input, the user may log into the account server 115. Since the log-in state is maintained for a predetermined validity period, as long as the user does not logs out, the user does not need to again log into the account server 115 for the predetermined validity period. When the user wants to use a smart home service using the controller device 100, the user needs to discover devices for the smart home service, and collect information about the discovered devices. For example, the user may select a controlled device 105 from among the discovered devices as a device that is to be registered in the connectivity server 110. In this case, device to device authentication between the controller device 100 and the controlled device 105 may be performed in order to transmit/receive information between the controller device 100 and the controlled device 105. The device discovery, information collection, and authentication, as described above, must be performed before the controlled device 105 is registered in the connectivity server 110. step Referring to FIG. 1B, the controller device 100 requests the account server 115 to send an authentication code, and acquires the authentication code from the account server 115, in order to register the controlled device 105 in the connectivity server 110, in step 130. The authentication code is a kind of key value for acquiring an access token that is used by the controlled device 105 from the account server 115. The controller device 100 transfers the authentication code to the controlled device 105, in step 135a. At this time, the authentication code may be transferred together with an ID. The controlled device 105 transfers the authentication code to the account server 115, in step 135b. The account server 115 receives the authentication code, and verifies whether the authentication code has been issued by the account server 115. If the verification is successfully completed, the account server 115 transfers access information to the controlled device 105, in step 140. The access information may include, for example, an access token and a refresh token. When the controlled device 105 accesses the connectivity server 110, the access token is used as a value for authenticating authority for use of the controlled device 105 through the connectivity server 110. The access token has a predetermined validity period, and if the predetermined validity period expires, the access token is no longer valid. Accordingly, the access token needs to be updated within the predetermined validity period. When the access token is updated, the refresh token is used.

If the controlled device 105 receives the access token successfully, the controlled device 105 may inform the controller device 100 of the successful reception of the access token. The controller device 100 may receive device information from the controlled device 105, and perform a procedure for registering the controlled device 105 in the service server 120. The service server 120 may perform a registration procedure of including the controlled device 105 in a device list for the smart home service, and then transfer registration-related information to the controlled device 105. Thereafter, the controlled device 105 accesses the connectivity server 110 using the registration-related information and the access token, in step 145. A validity period of the access token may be set to be different from a validity period of the refresh token.

Figure 1C:
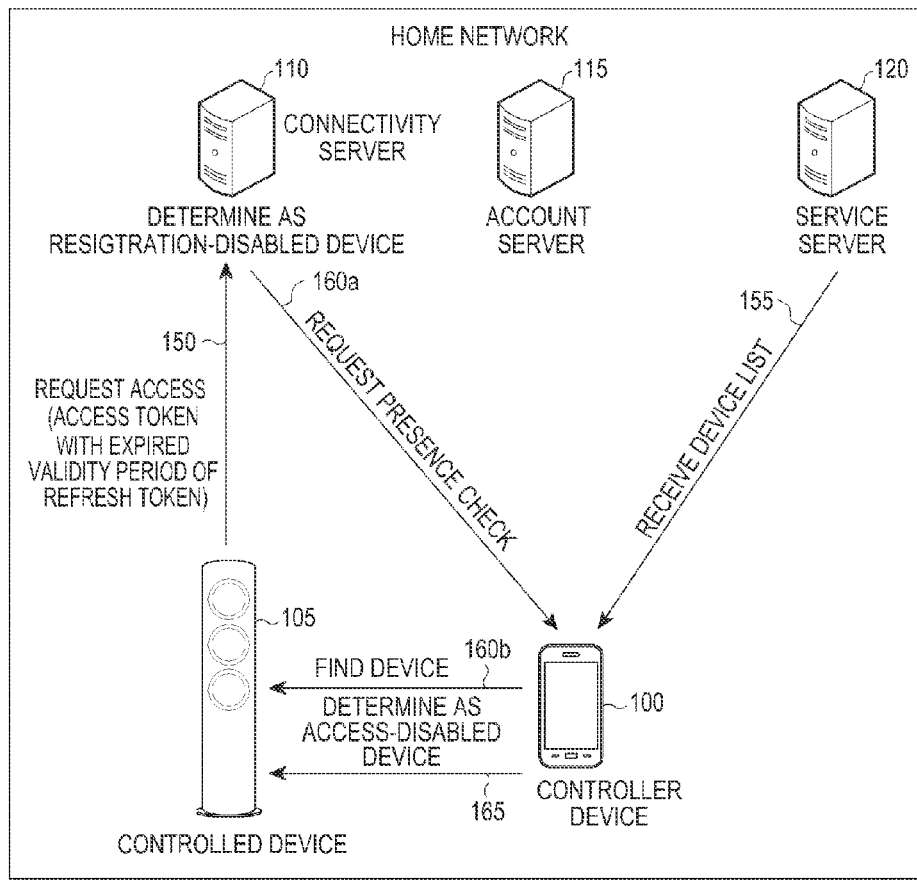
FIG. 1C is a diagram illustrating a problem that occurs in the method of registering the device for the general smart home service.

FIG. 1C is a diagram illustrating a problem that occurs in the method of registering the device for the general smart home service. For example, the validity period of the access token may be set to 30 days, and the validity period of the refresh token may be set to 90 days. It is assumed that the controlled device 105 requests access to the connectivity server 110 using an access token with a refresh token whose validity period has expired, in step 150. In this case, the connectivity server 110 determines that the access token is invalid, and determines that registration of the controlled device 105 is disallowed. The connectivity server 110 requests the controller device 100 to check whether the controlled device 105 is available in the smart home service, that is, the presence of the controlled device 105, in step 160a. The controller device 100 receives the presence check request, and discovers the controlled device 105, in step 160b. However, since the validity period of the controlled device 105 has already expired, although it has connected to the connectivity server 110 through the registration procedure described above, the controller device 100 determines the controlled device 105 as a "connection-disabled device", in step 165.

If the service server 120, which stores information of the controlled device 105 through the previous registration procedure, receives a request for the device list for the smart home service from the controller device 100, the service server 120 transfers the information of the controlled device 105 to the controller device 100 when the smart home application is executed on the controller device 100, in step 155. Then, a problem occurs in which the controlled device 105 appears in a connection-disabled state in an available device list on the smart home application or the controlled device 105 does not appear in the available device list.

According to embodiments of the present disclosure, by enabling a controller device and a service server, in addition to an account server, to manage access information of controlled devices for a smart home service, a problem, which involves the disabling of a connection to a connectivity service since access information of a device can be not recognized, can be resolved.

According to an embodiment of the present disclosure, an account server updates access information of controlled devices, and transfers the updated access information to a service server. The service server manages validity periods of access information for devices for a smart home service, based on the updated access information. The service server also includes the updated access information in a device list, and transfers the device list to a controller device. The controller device determines whether a validity period of access information of a controlled device has expired by checking the validity periods of access information for devices included in the device list. The service server maps a validity period of a refresh token included in access information of each device included in the stored device list, and transfers the device list to the controller device according to a request from the controller device.

Figure 2A:
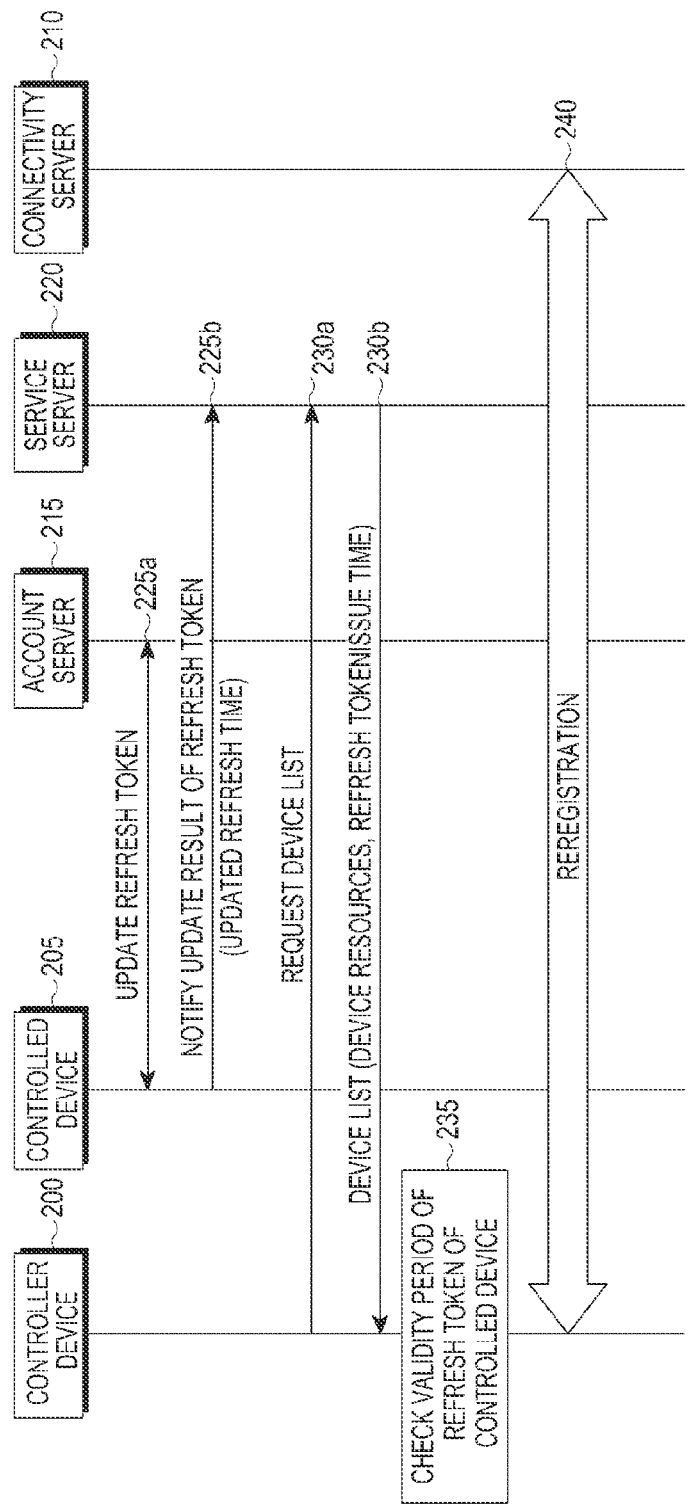
FIG. 2A is a diagram illustrating a method of managing access information of devices for a smart home service, according to an embodiment of the present disclosure.

FIG. 2A is a diagram illustrating a method of managing access information of devices for a smart home service, according to an embodiment of the present disclosure.

Referring to FIG. 2A, a home network includes a controller device 200, a controlled device 205, a connectivity server 210, an account server 215, and a service server 220. It is assumed that the controlled device 205 has been registered for a general smart home service through the controller device 200 and the connectivity server 210, and that the validity period of a refresh token of an already acquired access token with respect to the controlled device 205 has expired.

The account server 215 updates refresh tokens of controlled devices, and transfers the update result to the service server 220. For example, the account server 215 updates a refresh token of the controlled device 205, in step 225a. The controlled device 205 notifies the service server 220 of the updated refresh token, in step 225b.

The service server 220 receives the updated refresh tokens of the controlled devices from the account server 215, and manages validity periods of the refresh tokens of the controlled devices. For example, the service server 220 may map a user ID of the controlled device 205 to a Unique User IDentifier (UUID), Info, status, refresh time, etc. of the controller device 205, and store the results of the mapping. Herein, Info represents a model name, manufacturing company, specification, etc. of the controlled device 205, and status represents an step mode, setting information, etc. of the controlled device 205. For example, if the controlled device 205 is an air conditioner, the status may include step mode information, which is one of blowing, cooling, sleep mode, setting temperature, and wind speed. The refresh time represents a time at which the validity period of the corresponding refresh token expires. For example, the refresh time may be stored in the form of year/month/date: YY/mm/dd. The service server 220 may update a current refresh time of each controlled device to a "refresh time" acquired from the update result.

Referring back to FIG. 2A, if the service server 220 receives a request for a device list from the controller device 200, in step 230a, the service server 220 transfers a device list to the controller device 200 in response to the request, in step 230b. The device list may include resources of devices and updated refresh times. Accordingly, if the controller device 200 receives the device list, the controller device 200 determines connectivity states of devices determined to be connected for the smart home service, that is, whether the refresh token of the corresponding device has expired, in step 235, as described in greater detail below with respect to FIG. 2B.

Figure 2B:
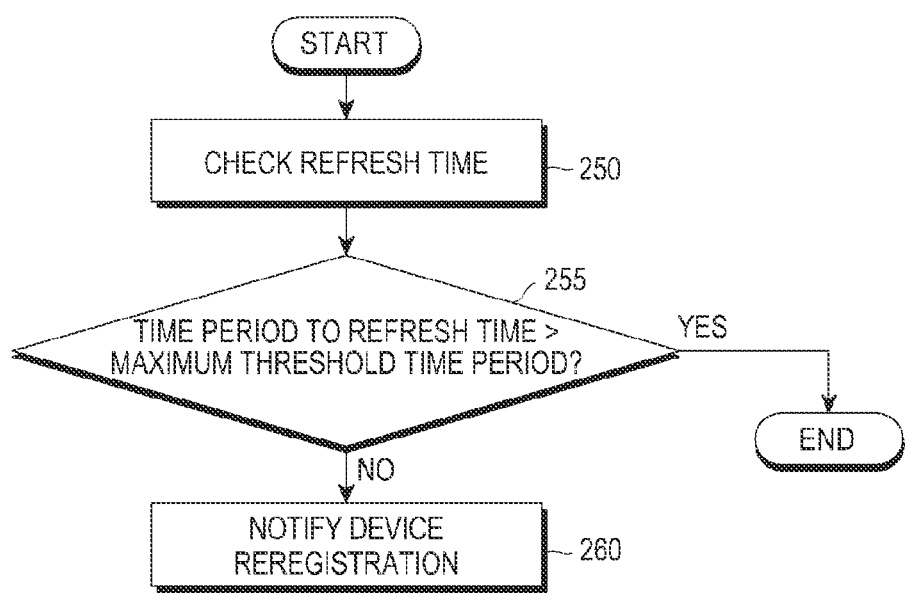
FIG. 2B is a flowchart illustrating an step in which a controller device checks access information of devices based on a device list acquired from a service server, according to the embodiment of the present disclosure illustrated in FIG. 2A.

FIG. 2B is a flowchart illustrating an step in which the controller device checks access information of devices based on the device list acquired from the service server, according to the embodiment of the present disclosure illustrated in FIG. 2A.

Referring to FIG. 2B, the controller device 200 checks a validity period of a refresh token of a controlled device (for example, the controlled device 205) determined to be connected for the smart home service, from the received device list, instep step 250. The controller device 200 determines whether a period from a current time to a refresh time of the refresh token exceeds a maximum threshold period, in order to notify updating of a validity period, instep step 255. The period from the current time to the refresh time may be calculated by subtracting the current time from the refresh time.

If the controller device 200 determines that the period from the current time to the refresh time does not exceed the maximum threshold period, the controller device 200 notifies the user that the controlled device 205 needs to be re-registered, instep step 260. A notification informing that the controller device 200 needs to be re-registered may be displayed in the form of a pop-up window on an application for the smart home service. If the controller device 200 determines that the period from the current time to the refresh time exceeds the maximum threshold period, the service server 200 terminates step.

Referring back to FIG. 2A, the controller device 200 receives the re-registration notification, and perform a procedure of re-registering the controlled device 205 in the service server 220, in step 240. The re-registration procedure may depend on whether the controlled device 205 is discovered in a procedure of discovering devices for the smart home service. If the controlled device 205 is discovered, the controller device 200 may perform a re-registration procedure with the service server 220. However, if the controlled device 205 is not discovered, the controller device 200 may perform a re-registration procedure for connecting the controlled device 205 to the service server 220 and registering the controlled device 205 in the service server 220. In the re-registration procedure, a procedure of collecting device information may be omitted since the controller device 200 has acquired device information of the controlled device 205 through the service server 220 in the previous registration procedure. Also, since access-related information acquired from the account server 215, that is, the refresh token, has expired, the controller device 200 may perform a registration procedure for registering the controlled device 205 in the connectivity server 210, as described above with reference to FIG. 1B.

According to another embodiment of the present disclosure, if an account server updates a refresh token of access information, a controlled device transfers the update result to a service server. The service server then manages validity periods of refresh tokens for devices. As in the first embodiment, the service server checks validity periods of devices included in a device list to thereby determine whether the validity period of the corresponding device has expired. The service server then sets a re-registration flag indicating whether a validity period of a refresh token of each of devices included in the stored device list has expired, and transfers the resultant device list to a controller device according to a request from the controller device. The controller device then checks the set re-registration flag from the device list received from the service server to determine whether the validity period of a refresh token of the corresponding device has expired.

Figure 3A:
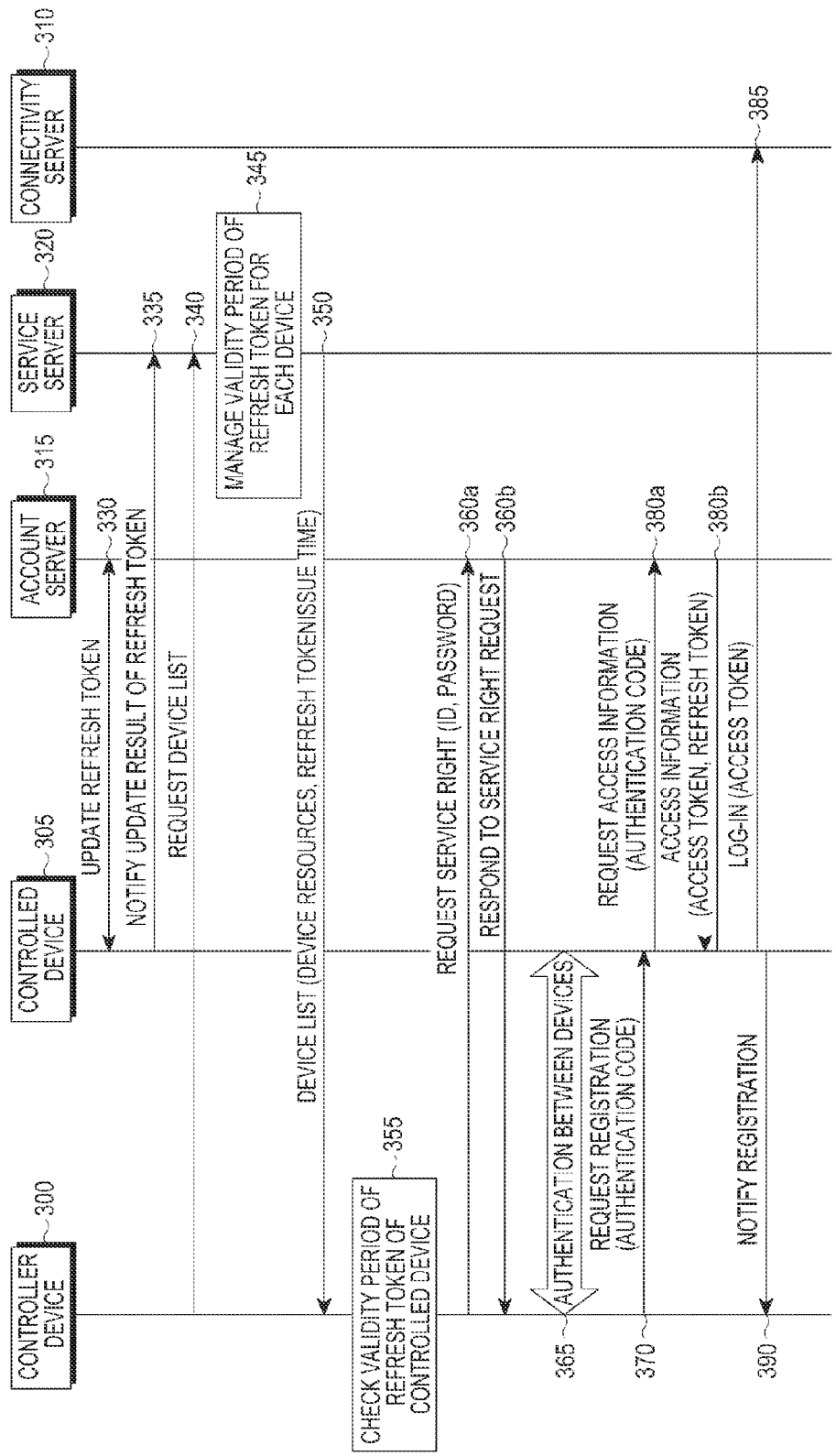
FIG. 3A is a diagram illustrating a method of managing access information of devices for a smart home service, according to an embodiment of the present disclosure.

FIG. 3A is a diagram illustrating a method of managing access information of devices for a smart home service, according to an embodiment of the present disclosure.

Referring to FIG. 3A, a home network includes a controller device 300, a controlled device 305, a connectivity server 310, an account server 315, and a service server 320. It is assumed that the controlled device 305 has been registered for a general smart home service through the controller device 300 and the connectivity server 310, and that the validity period of a refresh token of an already acquired access token with respect to the controlled device 305 has expired.

The account server 315 updates a refresh token of the controlled device 305, and transfers the updated refresh token to the controlled device 305, in step 330. The controlled device 305 notifies the service server 320 of the update result, in step 335. The update result may include Refresh Token Issue Time, which is a time at which the refresh token is updated.

If the service server 320 receives a request for a device list from the controller device 300, in step 340, the service server 320 manages validity times of refresh tokens of devices, in step 345, as in the embodiment of FIG. 2A. That is, the service server 320 maps a user ID of the controlled device 305 to a UUID, Info, status, refresh time, etc., of the controlled device 305, and stores the results of the mapping. The service server 320 updates a current refresh time of each controlled device to a "refresh time" acquired from the update result. Also, according to this embodiment of the present disclosure, the service server 320 determines whether validity periods of devices registered by the controller device 300 have expired, based on a device list of the devices, and sets and manages re-registration flags according to the results of the determination. The re-registration flag is an indicator indicating that a refresh token of the corresponding device needs to be updated.

Figure 3B:
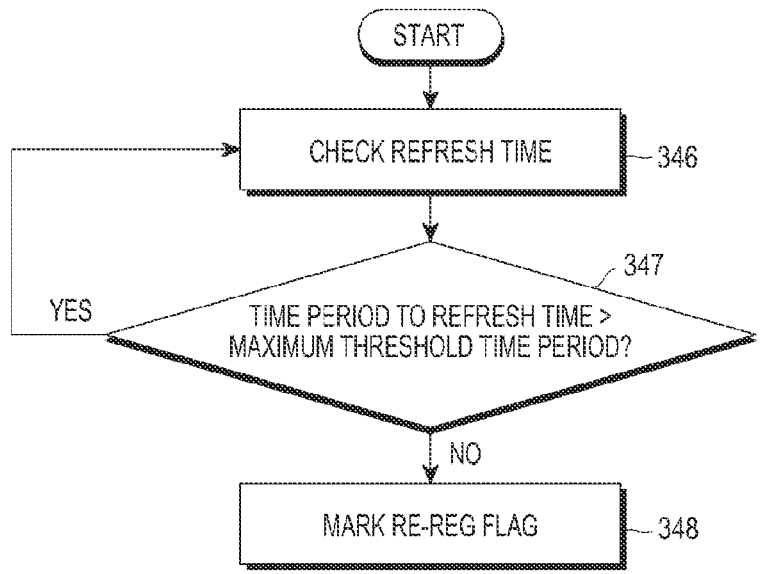
FIG. 3B is a flowchart illustrating an step in which a service server manages a validity period of a refresh token for each device included in a device list, according to the embodiment of the present disclosure illustrated in FIG. 3A.

FIG. 3B is a flowchart illustrating step in which the service server manages a validity period of a refresh token for each device included in the device list, according to the embodiment of the present disclosure illustrated in FIG. 3A.

Referring to FIG. 3B, the service server 320 checks validity periods of refresh tokens of devices included in the stored device list, in step 346. In step 347, the service server 320 determines whether a period to a refresh time of a refresh token of each device exceeds a maximum threshold period set in advance in order to notify of the updating of a validity period. The period to the refresh time may be calculated by subtracting the current time from the refresh time. If the service server 320 determines that the period to the refresh time does not exceed the maximum threshold period, the service server 320 sets a re-registration flag of the corresponding device, instep step 348. If the service server 320 determines that the period to the refresh time exceeds the maximum threshold period, the service server 320 terminates step.

Referring back to FIG. 3A, if the service server 320 receives a request for a device list from the controller device 300, the service server 320 transfers the device list to the controller device 300, in step 350. The device list may include resource information of devices and Refresh Token Issue Time, which is a time at which the refresh token of each device is updated. The controller device 300 receives the device list, and determines whether the validity period of the refresh token of the controlled device 305 has expired, in step 355, as described in greater detail below with respect to FIG. 3C.

Figure 3C:
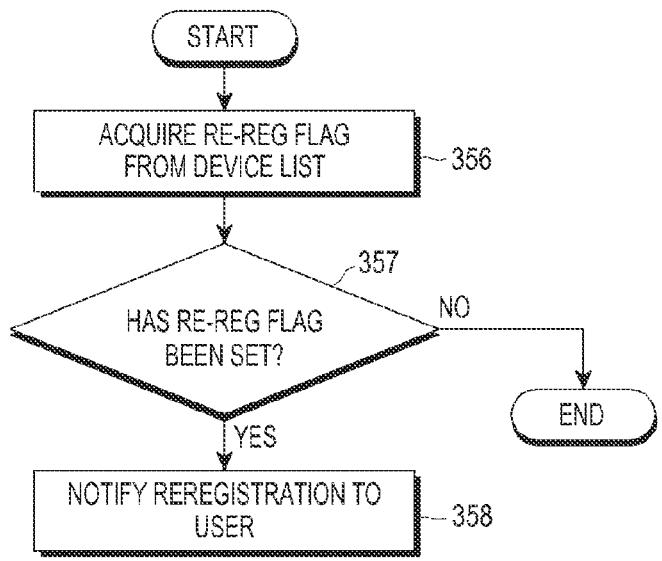
FIG. 3C is a flowchart illustrating an step in which a controller device determines whether a validity period of a refresh token of a controlled device has expired, according to the embodiment of the present disclosure illustrated in FIG. 3A.

FIG. 3C is a flowchart illustrating an step in which the controller device determines whether a validity period of a refresh token of the controlled device has expired, according to the embodiment of the present disclosure illustrated in FIG. 3A.

Referring to FIG. 3C, the controller device 300 acquires a re-registration flag of each device from the received device list, instep step 356. The controller device 300 determines whether there is a device with a set re-registration flag, instep step 357. If the controller device 300 discovers a device with a set re-registration flag, the controller device 300 notifies a user that the device has been re-registered, instep step 358. If the controller device 300 determines that there is no device with a set re-registration flag, the controller device 300 terminates step.

Referring back to FIG. 3A, it is assumed that the controller device 300 determines that the validity period of the refresh token of the controlled device 305 has expired, and notifies a user that the controlled device 305 has been re-registered. In this case, the controller device 300 transfers a service right request to the account server 315, in step 360a. The service right request may include an application ID and a password for the smart home service. The account server 315 identifies the controller device 300 based on the application ID and the password, and transfers a service right response to the controller device 300, in step 360*b*. The service right response may include an authentication code. The controller device 300 performs device-to-device authentication with the controlled device 305, in step 365. The controller device 300 transfers a request for registration in the connectivity server 310 to the controlled device 305, in step 370. The registration request may include the authentication code acquired from the account server 315. The controlled device 305 transfers an access information request including the authentication code to the account server 315, in step 380*a*. The account server 315 transfers access information (that is, an access token and a refresh token) corresponding to the access information request to the controlled device 305, in step 380*b*. The controlled device 305 logs into the connectivity server 310 using the access token, in step 385, and notifies the controller device 300 of registration in the connectivity server 310, in step 390.

According to another embodiment of the present disclosure, a controller device determines whether a validity period of a refresh token of a controlled device has expired based on Refresh Token Issue Time included in a device list acquired from a service server. If the controller device determines that the validity period of the refresh token of the controlled device has expired, the controller device requests the service server to re-register the controlled device, and to set a flag indicating that a request for re-register of the device. The service server re-registers the device, sets the flag according to the request from the controller device, and transfers a device list including the flag to the controller device.

Figure 4A:
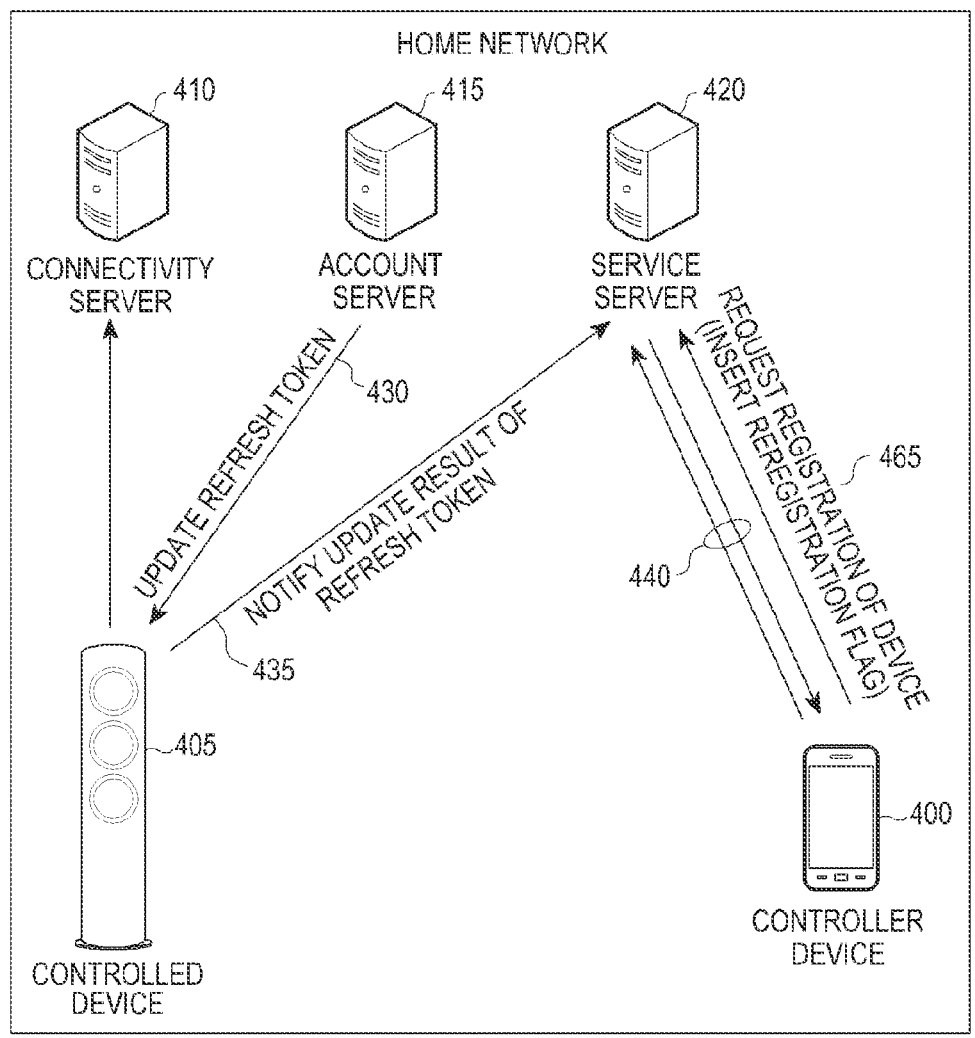
FIG. 4A is a diagram illustrating a method of managing access information for a smart home service, according to an embodiment of the present disclosure.

FIG. 4A is a diagram illustrating a method of managing access information for a smart home service, according to an embodiment of the present disclosure. As in the embodiments described above, a home network is composed of a controller device 400, a controlled device 405, a connectivity server 410, an account server 415, and a service server 420.

Referring to FIG. 4A, the account server 415 updates a refresh token of the controlled device 405 and transfers the update result to the controlled device 405, in step 430. The controlled device 405 notifies the service server 420 of the update result, in step 435. The update result may include Refresh Token Issue Time, which is a time at which the refresh token is updated. As in the embodiments described above, the service server 420 manages validity periods of refresh tokens of devices included in a stored device list. That is, the service server 420 updates a current refresh time of a refresh token of each device to a "refresh time" acquired from the update result.

Thereafter, if the service server 420 receives a request for a device list from the controller device 400, in step 440, the service server 420 transfers a device list in which Refresh Token Issue Time of each device is mapped to the controller device 400.

The controller device 400 then determines whether a validity period of a refresh token of each device included in the device list has expired.

Figure 4B:
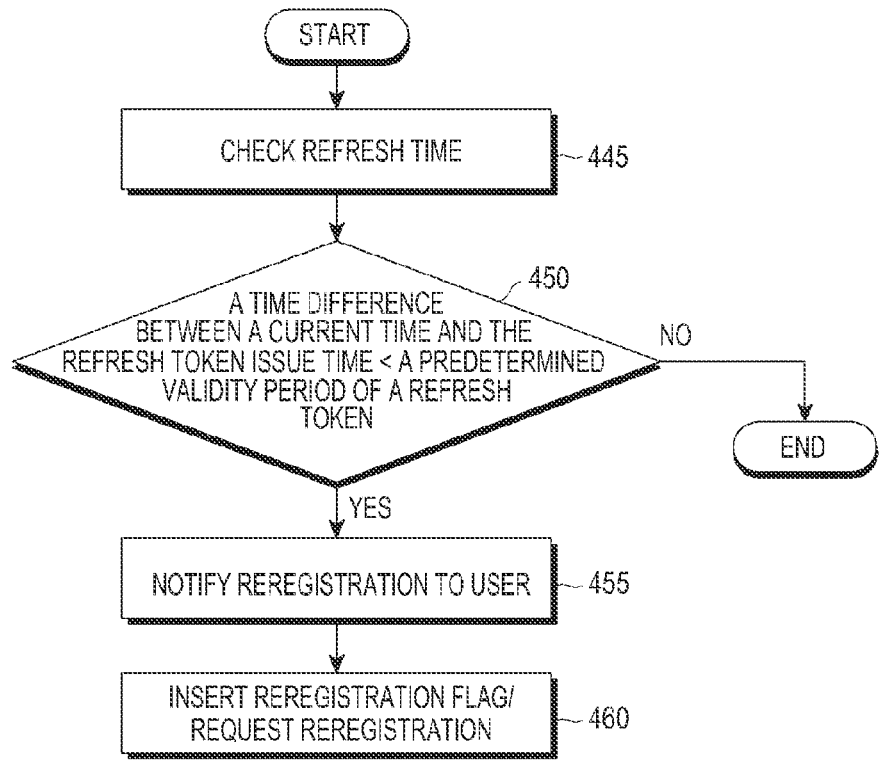
FIG. 4B is a flowchart illustrating an step in which a controller device determines whether a validity period of a refresh token of each device included in a device list has expired, according to the embodiment of the present disclosure illustrated in FIG. 4A.

FIG. 4B is a flowchart illustrating an step in which the controller device determines whether a validity period of a refresh token of each device included in the device list has expired, according to the embodiment of the present disclosure illustrated in FIG. 4A.

Referring to FIG. 4B, the controller device 400 checks a Refresh Token Issue Time of each device included in the device list, in step 445. The controller device 400 determines whether a time difference between a current time and the Refresh Token Issue Time of the corresponding device is less than a predetermined validity period of a refresh token, in step 450. If the controller device 400 determines that the time difference is less than the predetermined validity period of the refresh token, the controller device 400 notifies a user that the device needs to be re-registered, instep step 455. The controller device 400 requests the service server 420 to re-register the device while inserting a re-registration flag indicating that the device has been re-registered into a device list, in step 460 (and step 465 of FIG. 4A). The service server 420 re-registers the device, inserts a re-registration flag into a device list, and manages the device list, according to the request.

Figure 5:
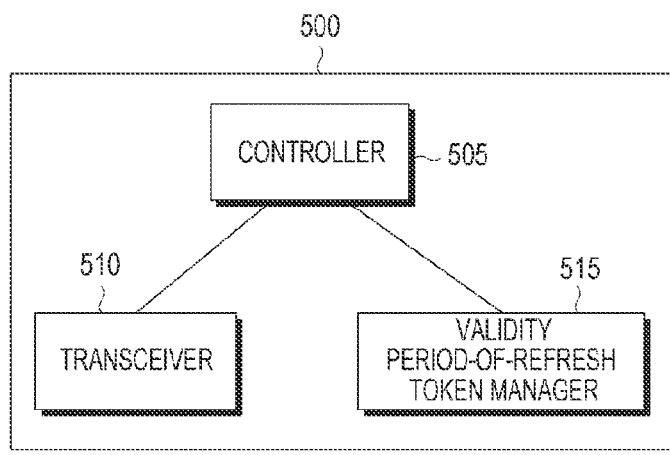
FIG. 5 is a diagram illustrating a configuration of an apparatus for managing a refresh token of a controlled device, according to an embodiment of the present disclosure.

FIG. 5 is a diagram illustrating a configuration of an apparatus of managing a refresh token of a controlled device, according to an embodiment of the present disclosure.

Referring to FIG. 5, an apparatus 500 includes a controller 505, a transceiver 510, and a validity period-of-refresh token manager 515.

The apparatus 500 may operate as a controller device or a servicer server, according to an embodiment of the present disclosure.

First, according to the embodiment of the present disclosure described with respect to FIG. 2A, the apparatus 500 operates as a controller device. If the controller 505 receives a device list through the transceiver 510, the controller 505 checks a refresh time for each device included in the device list. The validity period-of-refresh token manager 515 determines whether the validity period of a refresh token of the corresponding device has expired, according to an instruction from the controller 505. That is, if the validity period-of-refresh token manager 515 determines that a period from a current time to the refresh time is less than a maximum threshold period, the validity period-of-refresh token manager 515 notifies the controller 505 of the result of the determination. The controller 505 determines that the corresponding device needs to be re-registered, and notifies a user of re-registration of the device through the transceiver 510.

According to the embodiment of the present disclosure described with respect to FIG. 3A, the apparatus 500 operates as a service server. In this case, the service server 500 operates in a manner similar to that of the controller device in the embodiment of FIG. 2A. However, if the validity period-of-refresh token manager 515 determines that a period from a current time to the refresh time is less than a maximum threshold period, the controller 505 sets and manages a re-registration flag of the corresponding device. Thereafter, if the transceiver 510 receives a request for a device list from a controller device, the controller 505 controls the transceiver 510 to transmit the device list in which re-registration flags of devices are set to the controller device. The controller device checks a set re-registration flag of the corresponding device from the device list to determine whether the validity period of the refresh token of the corresponding device has expired.

Finally, according to the embodiment of the present disclosure described with respect to FIG. 4A, the apparatus 500 operates as a controller device. In this case, the validity period-of-refresh token manager 515 of the controller device 500 determines whether a validity period of a refresh token of the corresponding device has expired. If the validity period-of-refresh token manager 515 determines that the validity period of the refresh token of the corresponding device has expired, the controller 505 notifies a user of re-registration of the device through the transceiver 510. Then, the controller 505 re-registers the device, and requests setting and managing of a re-registration flag through the transceiver 510.

Therefore, by providing a method of enabling a service sever and a controller device to manage access information of devices upon registration of a device for a smart home service, a problem in which a connection to a connectivity service is disabled when a controller device cannot acquire access information of a registered controlled device can be resolved.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method of managing access information for registration of a first device, by a second device, in a smart home service, the method comprising the steps of:
checking a validity period of a refresh token for updating an access token of the first device included in a device list for the smart home service, which is received from a server; and
requesting, by the second device, the server to re-register the first device, if a period from a current time until an end of the validity period is less than a predetermined threshold period.

2. The method of claim 1, wherein checking the validity period of the refresh token comprises checking a first flag indicating that the validity period of the refresh token of the first device has expired.

3. The method of claim 1, wherein checking the validity period of the refresh token comprises:
acquiring an update time of the refresh token of the first device from the device list; and
calculating a time difference between the current time and the update time, wherein the time difference is the period from the current time until the end of the validity period.

4. The method of claim 1, wherein requesting the server to re-register the first device comprises instructing the server to set a second flag indicating re-registration of the first device to the device list.

5. A method of managing access information for registration of a first device, by a service server, in a smart home service, the method comprising the steps of:
transmitting a device list for the smart home service, to a second device, which is requested by the second device and includes a validity period of a refresh token of the first device and a first flag indicating whether the validity period of the refresh token has expired; and
receiving a request, from the second device, for re-registering the first device if a period from a current time until an end of the validity period is less than a predetermined threshold period.

6. The method of claim 5, further comprising:
re-registering the first device;
setting a second flag indicating re-registration of the first device to the device list; and
transmitting the device list to the second device, after the request for re-registering the first device is received from the second device.

7. The method of claim 5, further comprising updating the validity period of the refresh token of the first device, based on an update time of the refresh token acquired from an update result of the refresh token, which is received from an account server.

8. A controller device for managing access information for registration of a first device in a smart home service, the controller device comprising:
a transceiver; and
a controller configured to check a validity period of a refresh token for updating an access token of the first device included in a device list for the smart home service, which is received from a server, and to control the transceiver to request the server to re-register the first device, when a period from a current time until an end of the validity period is less than a predetermined threshold period.

9. The controller device of claim 8, wherein the controller is further configured to check a first flag indicating that the validity period of the refresh token of the first device has expired.

10. The controller device of claim 8, wherein the controller is further configured to acquire an update time of the refresh token of the first device from the device list, and calculate a time difference between the current time and the update time, the time difference being the period from the current time until the end of the validity period.

11. The controller device of claim 8, wherein the controller is further configured to control the transceiver to transmit an instruction for instructing the server to set a second flag indicating re-registration of the first device to the first device, to the server.

12. A service server for managing access information for registration of a first device in a smart home service, the service server comprising:
a transceiver; and
a controller configured to:
control the transceiver to transmit a device list for the smart home service, to a second device, which is requested by the second device and includes a validity period of a refresh token of the first device and a first flag indicating whether the validity period of the refresh token has expired, and
control the transceiver to receive a request, from the second device, for re-registering the first device, if a period from a current time until an end of the validity period is less than a predetermined threshold period.

13. The service server of claim 12, wherein the controller is further configured to:
re-register the first device;
set a second flag indicating re-registration of the first device to the device list; and
control the transceiver to transmit the device list to the second device, after the request for re-registering the first device is received from the second device.

14. The service server of claim 12, wherein the controller is further configured to update the validity period of the refresh token of the first device, based on an update time of the refresh token acquired from an update result of the refresh token, which is received from an account server.

* * * * *